UNITED STATES PATENT OFFICE.

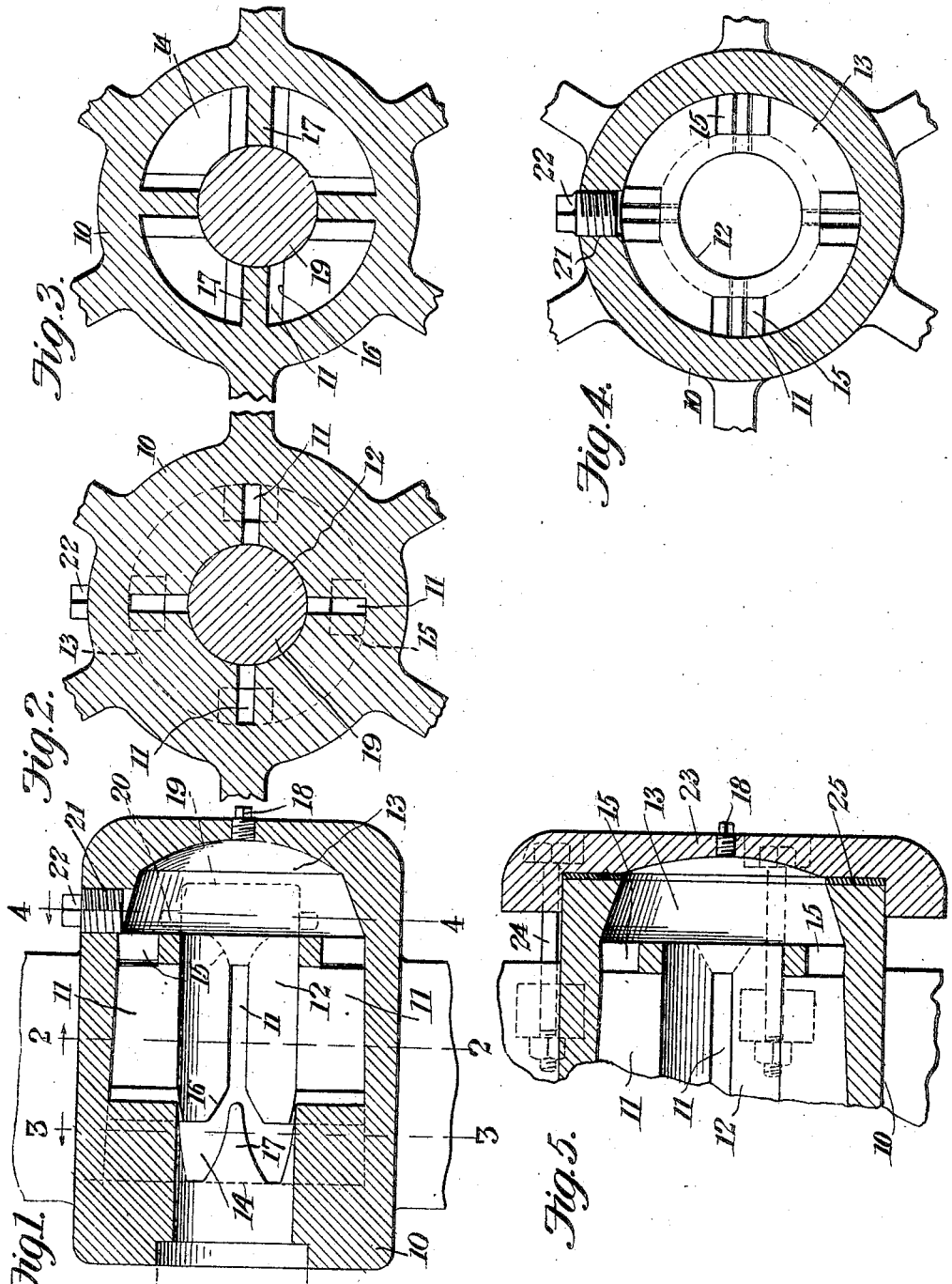

DODSON HASLUP, OF GRAFTON, WEST VIRGINIA.

HUB FOR CAR-WHEELS.

No. 813,418.   Specification of Letters Patent.   Patented Feb. 27, 1906.

Application filed August 31, 1905. Serial No. 276,606.

*To all whom it may concern:*

Be it known that I, DODSON HASLUP, a citizen of the United States, residing at Grafton, in the county of Taylor and State of West Virginia, have invented a new and useful Hub for Car-Wheels, of which the following is a specification.

This invention relates to self-lubricating wheel-hubs, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a longitudinal sectional elevation of a wheel-hub with the improvements embodied therein. Fig. 2 is a transverse section on the line 2 2 of Fig. 1. Fig. 3 is a transverse section on the line 3 3 of Fig. 1. Fig. 4 is a transverse section on the line 4 4 of Fig. 1. Fig. 5 is a sectional detail illustrating a modification in the construction.

The improved device may be employed to advantage in the hubs of any of the various forms of wheels which rotate upon their axles, but is more particularly designed for use in connection with the wheels of mining-cars and similar structures, and for the purpose of illustration is shown applied to the hub 10 of a wheel of this character.

The improvement consists in forming a plurality of radially-disposed oil-ducts 11, leading into the central axle-bearing 12 of the hub and with an oil-receptacle 13 at one end and a chamber 14 at the other end of the hub, the receptacle and chamber communicating, respectively, with the opposite ends of the ducts. The side walls of the outer ends of the ducts 11 diverge where they enter the oil-chamber, as at 15, and the side walls of the ducts also diverge, as at 16, where they unite with the chamber 14. Formed within the chamber 14 opposite each of the ducts 11 are V-shaped division-webs 17, the smaller ends of the webs terminating within the enlarged ends 16 of the ducts, as shown in Fig. 1. A feed-aperture closed by a threaded plug 18 is formed in the outer end of the hub and communicating with the oil-chamber 13.

The axle-spindle 19 (indicated by dotted lines in Fig. 1 and by full lines in Figs. 2 and 3) is supported in place by a transverse pin 20, the latter inserted and removed through an aperture 21, closed when not in use by a screw-plug 22.

The outer sides of the conduits 11 are inclined toward the rear or inner end of the hub, as shown in Fig. 1, the larger ends being toward the chamber 14.

By this arrangement when the receptacle 13 is supplied with oil through the aperture closed by the plug 18 and the wheel rotates upon the spindle the oil is carried by the ducts 11 into the chamber 14, and as the V-shaped webs rotate beneath the oil they cause it to flow back again into the ducts and thence to the oil-receptacle again, and so on, continuously maintaining a constant circulation of the oil back and forth longitudinally of the spindle. The oil is thus fed uniformly to all parts of the spindle and all danger of any part becoming dry and heating is obviated.

The inclined outer sides of the oil-ducts is an important feature of the invention, as the circulation is thereby materially facilitated, as the oil is caused to flow freely from the receptacle 13 to the chamber 14 by gravity when the wheel is at rest and thrown outward and carried toward the receptacle by the combined action of the centrifugal force and gravity as the wheel is rotated.

The hub may be in a single piece, as in Figs. 1, 2, and 3, or with a detachable cap 23, as in Fig. 5, the cap being attached by bolts 24 and leakage prevented by a rubber or like gasket 25. This construction may be advantageous for some forms of wheels or for wheels employed for some purposes.

Having thus described the invention, what is claimed is—

1. A self-oiling wheel-hub provided with a plurality of oil-ducts leading radially from the spindle-bearing with the outer sides inclined toward one end of the hub, an oil-receptacle at one end of the hub and communicating with the smaller ends of said ducts, and an oil-chamber at the other end of the hub extending entirely around the spindle-bearing and communicating with the larger ends of said ducts.

2. A self-oiling wheel-hub provided with a plurality of oil-ducts leading radially from the spindle-bearing, an oil-receptacle at one end of the hub communicating with one end of said ducts, an oil-chamber at the other end of the hub communicating with the other end of said ducts, and V-shaped division-webs in said chamber disposed with their outer ends opposite said ducts and directing the oil into the same.

3. A self-oiling wheel-hub provided with a plurality of oil-ducts leading radially from the spindle-bearing and with their side walls diverging at the ends, an oil-receptacle at one end of the hub and communicating with said ducts at one end, an oil-chamber at the other end of the hub communicating with the other ends of said ducts and V-shaped division-webs in said chamber disposed with their smaller ends within the adjacent enlarged ends of said ducts.

In testimony that I claim the foregoing as my own I have hereto affixed my signature in the presence of two witnesses.

DODSON HASLUP.

Witnesses:
J. GORDON,
JNO. F. TURNER.